(12) United States Patent
Kauppinen et al.

(10) Patent No.: US 11,218,097 B2
(45) Date of Patent: Jan. 4, 2022

(54) METHOD FOR DETERMINING ROTOR POSITION OF ELECTRIC MOTOR, ELEVATOR AND ELECTRICAL CONVERTER UNIT

(71) Applicant: KONE Corporation, Helsinki (FI)

(72) Inventors: Tuukka Kauppinen, Helsinki (FI); Lauri Stolt, Helsinki (FI); Mikko Paakkinen, Helsinki (FI)

(73) Assignee: KONE Corporation, Helsinki (FI)

( * ) Notice: Subject to any disclaimer, the term of this patent is extended or adjusted under 35 U.S.C. 154(b) by 35 days.

(21) Appl. No.: 16/794,623

(22) Filed: Feb. 19, 2020

(65) Prior Publication Data

US 2020/0287485 A1 Sep. 10, 2020

(30) Foreign Application Priority Data

Mar. 8, 2019 (EP) ..................................... 19161497

(51) Int. Cl.
| | |
|---|---|
| *H02P 21/18* | (2016.01) |
| *H02P 6/185* | (2016.01) |
| *B66B 1/30* | (2006.01) |
| *G01B 7/00* | (2006.01) |
| *H02P 6/20* | (2016.01) |
| *H02P 21/00* | (2016.01) |

(52) U.S. Cl.
CPC .............. *H02P 6/185* (2013.01); *B66B 1/308* (2013.01); *G01B 7/003* (2013.01); *H02P 6/20* (2013.01); *H02P 21/00* (2013.01); *H02P 2207/05* (2013.01)

(58) Field of Classification Search
CPC .......... H02P 21/18; H02P 6/185; H02P 21/00; H02P 2207/05; B66B 1/285; B66B 1/308
See application file for complete search history.

(56) References Cited

U.S. PATENT DOCUMENTS

| | | | |
|---|---|---|---|
| 2013/0075199 A1* | 3/2013 | Kauppinen | ............. B66B 1/285 187/247 |
| 2014/0312881 A1 | 10/2014 | Degner et al. | |
| 2015/0042249 A1 | 2/2015 | Lin | |
| 2018/0241333 A1* | 8/2018 | Sakai | ...................... H02P 21/18 |

FOREIGN PATENT DOCUMENTS

WO   WO 2009/130363 A1   10/2009

\* cited by examiner

*Primary Examiner* — Cortez M Cook

(74) *Attorney, Agent, or Firm* — Birch, Stewart, Kolasch & Birch, LLP (57) ABSTRACT

A method for determining a rotor position of an electric motor, an elevator and an electrical converter unit are presented. The method comprises supplying a first excitation signal to the electric motor, determining a first response signal generated in the motor in response to the first excitation signal, determining, based on the first response signal, an electrical angle of a direct axis of the motor with respect to a stationary reference frame, supplying a second excitation signal to the motor, wherein the second excitation signal is based on the determined electrical angle, determining a second response signal generated in the motor in response to the second excitation signal, and determining the rotor position based on the second response signal.

16 Claims, 6 Drawing Sheets

FIG. 6B

US 11,218,097 B2

METHOD FOR DETERMINING ROTOR POSITION OF ELECTRIC MOTOR, ELEVATOR AND ELECTRICAL CONVERTER UNIT

FIELD OF THE INVENTION

The present invention relates in general to electrical motors. In particular, however not exclusively, the present invention concerns determining the rotor position of an elevator motor.

BACKGROUND

There are known solutions for determining rotor position of an electric motor. In some solutions, a resolver has been attached to the rotor for measuring the absolute position of the rotor. This, however, increases the number of components and requires space for the resolver.

According to another known solution, a frequency converter connected to the motor is utilized to determine the rotor position. In the solution, the load bridge of the converter is fitted to supply a first alternating voltage excitation signal to the electric motor. The current of the stator winding of the electric motor produced by the supplied alternating voltage excitation signal is measured with the current sensors. The measured current forms a first alternating current response signal corresponding to the supplied first alternating voltage excitation signal, and the position of the rotor of the electric motor is determined on the basis of the determined aforementioned first alternating current response signal.

However, problems can arise in situations in which the excitation signal causes the rotor to move. In elevators, for example, this would mean that the elevator car also moves which may cause undesired conditions for the passengers inside, entering or leaving the car. In these situations, the determination of the rotor position can fail. In order to avoid the failing, the brake for keeping the rotor in its place must be oversized which add costs. Furthermore, the excitation signal causes noise and mechanical vibrations in the system. There is thus still a need to develop solutions for determining the rotor position of electric motors.

SUMMARY

An objective of the present invention is to provide a method for determining a rotor position of an electric motor, an elevator, and an electrical converter unit. Another objective of the present invention is that the method, the elevator, and the electrical converter unit minimize the force causing rotor movement during determination of the rotor position and, thus, the force that is required for keeping the rotor in its position, such as by a brake.

The objectives of the invention are reached by a method, an elevator, and an electrical converter unit as defined by the respective independent claims.

According to a first aspect, a method for determining a rotor position of an electric motor, such as of an elevator, is provided. The method comprises
supplying a first excitation signal to the electric motor,
determining a first response signal generated in the electric motor in response to the first excitation signal,
determining, based on the first response signal, an electrical angle of a direct axis of the electric motor with respect to a stationary reference frame, such as related to a stator of the electric motor,
supplying a second excitation signal to the electric motor, wherein the second excitation signal is based on the determined electrical angle,
determining a second response signal generated in the electric motor in response to the second excitation signal, and
determining the rotor position based on the second response signal.

In some embodiments, the first excitation signal may be a first alternating voltage signal, such as having a constant amplitude, and the first response signal may be a first response current generated in response to the first alternating voltage signal, or/and the second excitation signal may be a second alternating voltage signal, such as having a constant amplitude, and the second response signal may be a second response current generated in response to the second alternating voltage signal.

Alternatively, the first excitation signal may be a first alternating current signal, such as having a constant amplitude, and the first response signal may be a first response voltage generated in response to the first alternating current signal, or/and the second excitation signal may be a second alternating current signal, such as having a constant amplitude, and the second response signal may be a second response voltage generated in response to the second alternating current signal.

In an embodiment, the first excitation and the second response signals may be voltage or current signals, and the second excitation and the first response signals may be current or voltage signals, respectively.

In various embodiments, the method may comprise, prior to said supplying the first excitation signal, applying a force having a first amount for maintaining a rotor of the motor in its position at least during said supplying of the first excitation signal and said determining the first response signal, wherein the first amount is with respect to a direction for opposing the movement of the rotor.

In various embodiments, the first excitation signal may comprise consecutively supplying one alternating excitation signal, such as voltage or current, generating a rotating field in one direction and another alternating excitation signal, such as voltage or current, generating a rotating field in an opposite direction inside the motor.

In various embodiments, said determining of the electrical angle may comprise determining electrical angle of the first excitation signal at which a maximum of the first response signal occurs.

In various embodiments, said determining of the rotor position may comprise comparing values of maxima of the second response signal for determining positions of south and north poles of the rotor.

In various embodiments, the second excitation signal may be configured to be supplied by gradually increasing its amplitude for avoiding a step-like change in the generated force in the motor.

In various embodiments, the electric motor is an elevator motor of an elevator, wherein the elevator comprises at least one elevator brake for braking the motor, and wherein the method may comprise applying the force by the at least one elevator brake.

In various embodiments, a force for moving the rotor produced by the first excitation signal may be less than the first amount so that the rotor maintains its position during the supplying of the first excitation signal.

In various embodiments, the electric motor may be one of the following: a synchronous reluctance motor, a permanent magnet motor, a permanent magnet linear motor, a permanent magnet assisted synchronous reluctance motor, a linear switched reluctance motor.

According to a second aspect, an elevator is provided. The elevator comprises an elevator car, an elevator motor configured to move the elevator car, an electrical converter unit for operating the elevator motor, at least one elevator brake, and a control unit configured at least to perform the method according to the first aspect or any embodiment thereof.

The control unit may, thus, be configured to cause the elevator, preferably the electrical converter unit thereof, to:
  supply a first excitation signal, such as a first excitation voltage or current signal, to the elevator motor,
  determine a first response signal, such as a first response current or voltage, respectively, generated in the elevator motor in response to the first excitation signal;
  determine, based on the first response signal, an electrical angle of a direct axis of the electric motor with respect to a stationary reference frame, such as related to a stator of the electric motor,
  supply a second excitation signal, such as a second excitation voltage or current signal, to the electric motor, wherein the second excitation signal is based on the determined electrical angle,
  determine a second response signal, such as a second response current or voltage, respectively, generated in the electric motor in response to the second excitation signal, and
  determine the rotor position based on the second response current.

In various embodiments, the control unit may further be configured at least to cause the at least one elevator brake to:
  apply a force having a first amount for maintaining a rotor of the motor in its position, such as locked into its position, at least during said supplying of the first excitation signal and said determining the first response signal, wherein the first amount is in a direction for opposing the movement of the rotor.

In some embodiments, said determining of the electrical angle may comprise determining electrical angle of the first excitation signal at which a maximum of the first response signal occurs.

In some embodiments, said determining of the rotor position may comprise comparing values of maxima of the second response signal for determining positions of south and north poles of the rotor.

According to a third aspect, an electrical converter unit is provided. The electrical converter unit is configured at least to perform the method according to the first aspect or any embodiment thereof.

The electrical converter unit may, thus, be configured at least to:
  supply a first excitation signal, such as a first excitation voltage or current signal, to the elevator motor,
  determine a first response signal, such as a first response current or voltage, respectively, generated in the elevator motor in response to the first excitation signal;
  determine, based on the first response signal, an electrical angle of a direct axis of the electric motor with respect to a stationary reference frame, such as related to a stator of the electric motor,
  supply a second excitation signal, such as a second excitation voltage or current signal, to the electric motor, wherein the second excitation signal is based on the determined electrical angle,
  determine a second response signal, such as a second response current or voltage, respectively, generated in the electric motor in response to the second excitation signal, and
  determine the rotor position based on the second response signal.

In various embodiments, the electrical converter unit may comprise a converter device, such as a frequency converter or an inverter, and current and/or voltage determination means for determining at least the first and second response signals.

The present invention provides advantages over known solutions. During supplying of the excitation signals in the rotor position determination process, the rotor is, or at least can be, easily kept in its position. Minimization of the force causing rotor movement during determination of the rotor position and, thus, minimization of the force that is required for keeping the rotor in its position, allows the use of less braking force and, thus, a smaller brake or less frequent use of the brake. This is especially advantageous, for example, in elevators in which the motor is arranged to move the elevator car. Thus, during the determination of the rotor position the elevator car does not move. The moving could be unpleasant for the passengers inside the car. Furthermore, the excitation signals cause less noise and vibrations in the motor with respect to known solutions utilizing excitation signal(s) for determining the rotor position.

Various other advantages will become clear to a skilled person based on the following detailed description.

The expression "a number of" may herein refer to any positive integer starting from one (1), that is being at least one.

The expression "a plurality of" may refer to any positive integer starting from two (2), respectively, that is being at least two.

The terms "first", "second" and "third" are herein used to distinguish one element from another element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1A:
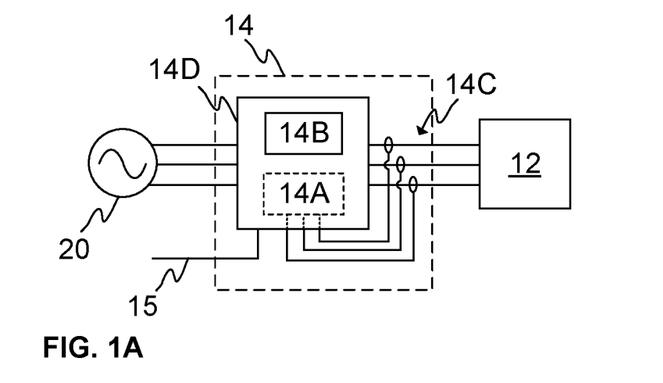
FIGS. 1A-1C illustrate schematically electrical converter units according to some embodiments of the present invention.

FIG. 1A illustrates schematically an electrical converter unit 14 according to an embodiment of the present invention. The electrical converter unit 14 may comprise a frequency converter or an inverter, or, specifically, the power conversion circuit(s) 14B thereof. Furthermore, the electrical converter unit 14 may comprise current determination means 14C and/or voltage determination means (not shown) for determining current(s) flowing into or out of the electric motor 12, such as three instantaneous phase currents, or voltages present between the motor phases or between motor phase and the ground/reference/neutral potential, such as a star point of the motor 12, respectively. The current determination means 14C and/or the voltage determination means may, preferably, be arranged in connection with the control unit 14A for providing information about said current(s)/voltages to the control unit 14A. Preferably, the electrical converter unit 14 may be configured at least to control said current(s)/voltage(s) in normal operating conditions for controlling the operation of the motor 12, such as rotation or movement of the rotor of the motor 12.

Figure 2:
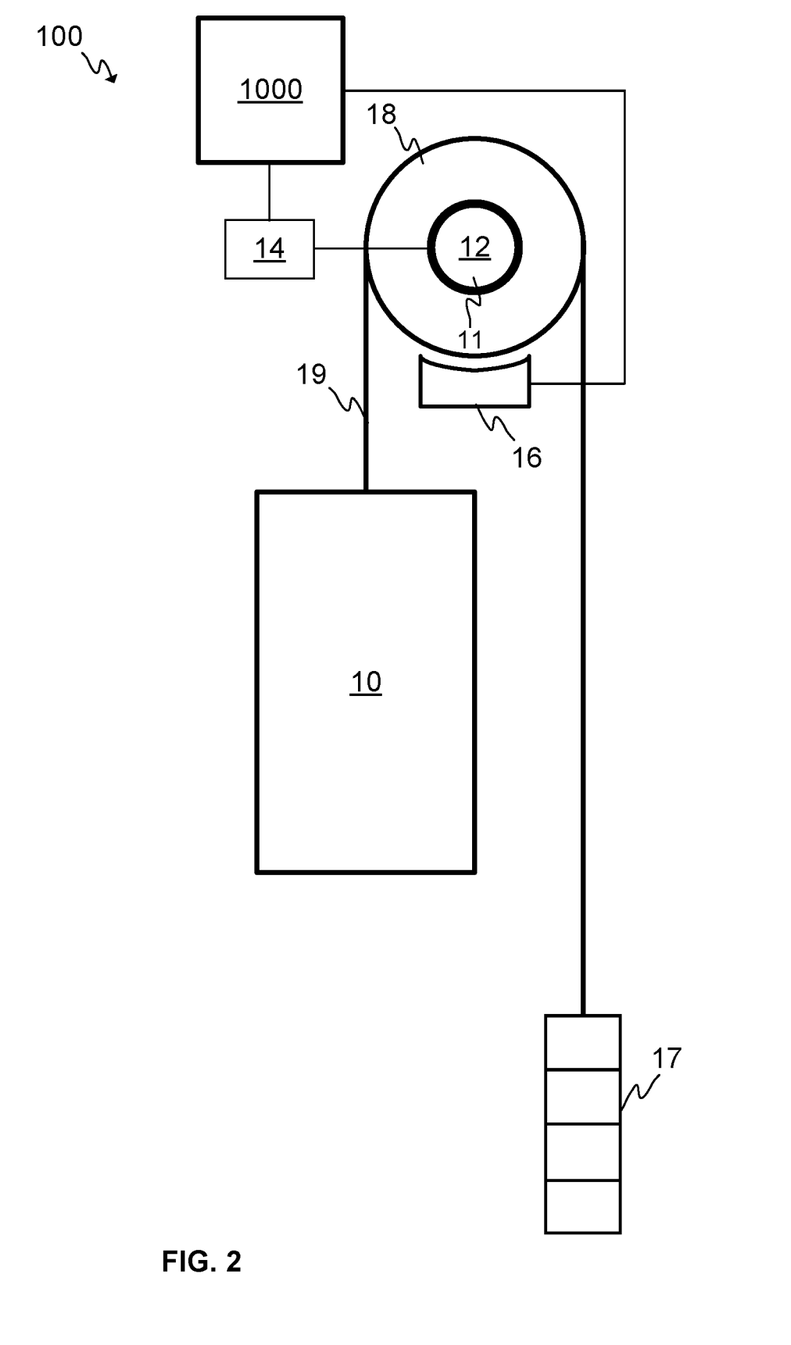
FIG. 2 illustrates schematically an elevator according to an embodiment of the present invention.
Figure 3:
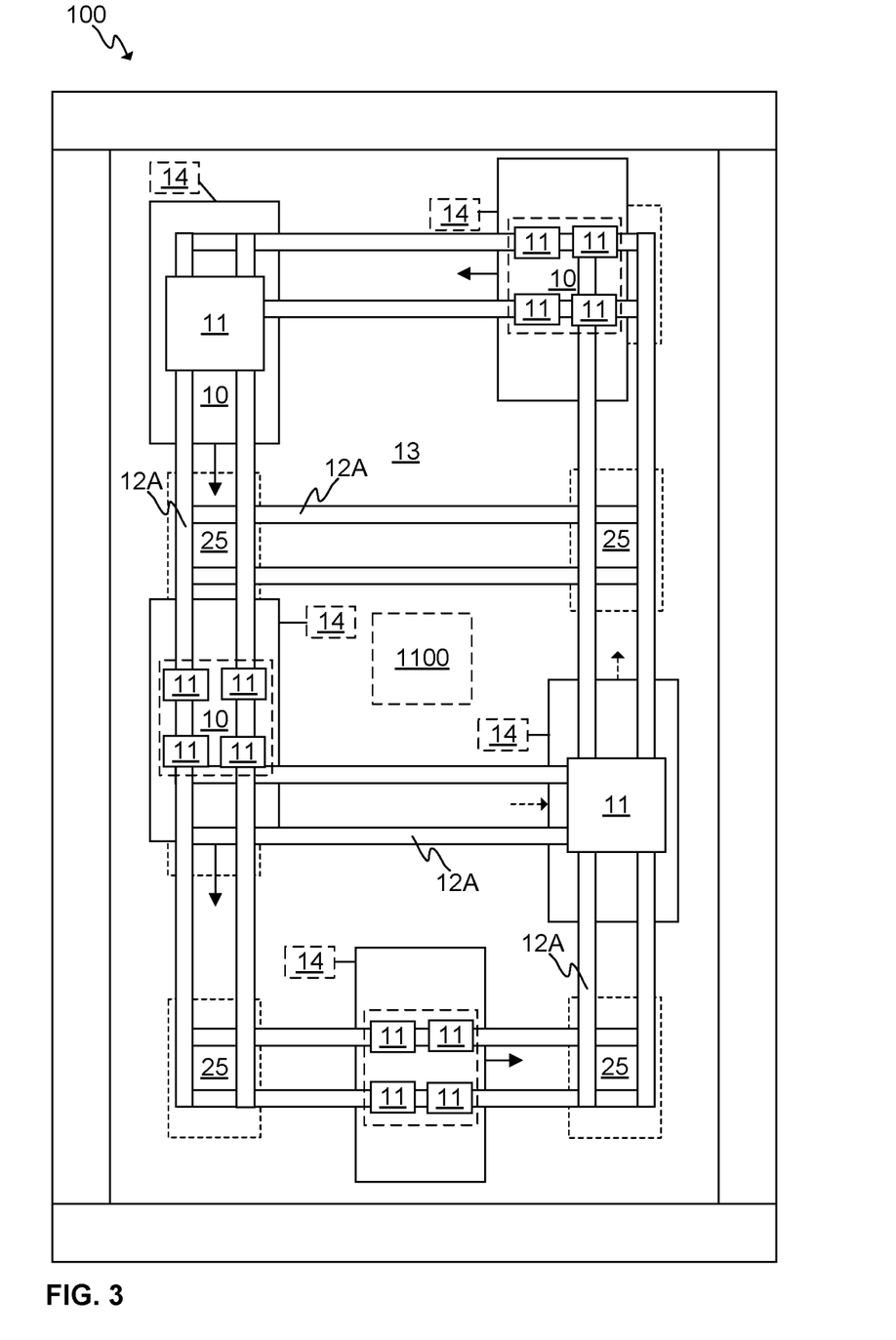
FIG. 3 illustrates schematically an elevator according to an embodiment of the present invention.

Furthermore, the electrical converter unit 14 may comprise a control unit 14A arranged closely, such as inside the same housing, with the converter device 14D, such as a frequency converter or an inverter, comprising power conversion circuit(s) 14B thereof. There may also be arranged an external connection 15 to the electrical converter unit 14 for providing, for example, measurement(s), control signal(s) and/or electrical power, from an external system in connection with the electrical converter unit 14, or specifically with the control unit 14A thereof. The external system may be, for example, a vehicle, an industrial process, or an elevator such as shown in FIGS. 2 and 3.

Figure 1B:
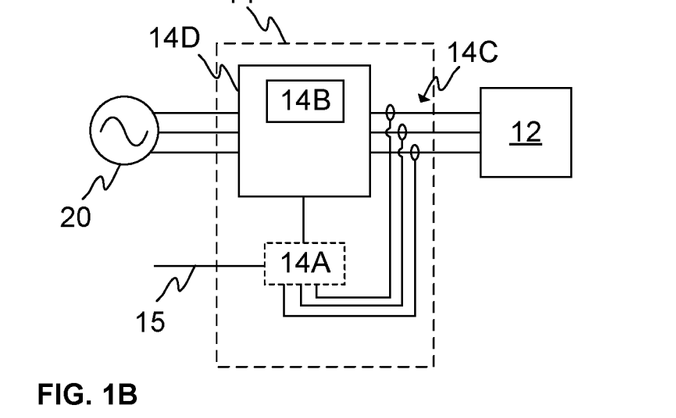

FIG. 1B illustrates schematically an electrical converter unit 14 according to an embodiment of the present invention. The electrical converter unit 14 in FIG. 1B is otherwise similar to one shown in and described with respect to FIG. 1A except that the control unit 14A is arranged separately with respect to the converter device 14D, such as outside the housing thereof. The control unit 14A may, thus, be arranged merely to be in connection with conversion circuit(s) 14B. The control unit 14A may be, for example, part of the controlling unit of the external system comprising the electrical converter unit 14.

Figure 1C:
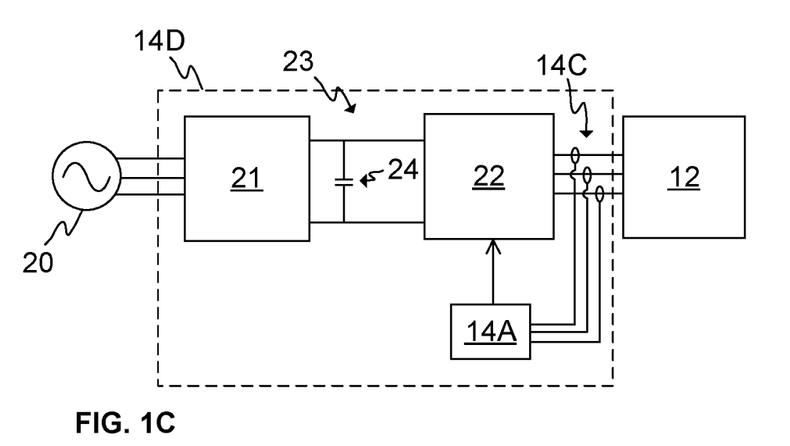

FIG. 1C illustrates schematically an electrical converter unit 14 according to an embodiment of the present invention. In FIG. 1C, an electrical converter unit 14 may comprise a frequency converter with an energy storage 24, such as a capacitor (bank) or a battery, arranged to the intermediate circuit 23 thereof, or in case of battery, at least in connection with the intermediate circuit 23. The frequency converter may be arranged to supply electrical power between the electrical network 20 and the electric motor 12. The frequency converter may comprise a load bridge 22 which is connected to the electric motor 12 for supplying electrical power between the electric motor 12 and the load bridge 22.

The load bridge 22 may comprise controllable solid-state switches, such as forming power conversion circuit of a three-phase two- or three-level inverter. The supply voltage of the electric motor 12 may be formed by controlling the solid-state switches of the load bridge 22 with the control unit 14A of the load bridge 22 with, for example, pulse-width modulation (PWM) technique. The frequency converter may comprise current 14C and/or voltage determination means, such as current or voltage sensors, which may be arranged to be in connection with supply cables of the stator winding of the motor 12 for measuring the stator currents and/or voltages.

The electrical converter unit 14 as described hereinabove with respect to FIGS. 1A-1C may be configured to control the operation of the electric motor 12, for example, by a field-oriented control or vector control method as is known to a person skilled in the art.

In various embodiments of the present invention, the electrical converter unit 14, or specifically the control unit 14A thereof, illustrated in any of FIGS. 1A-1C and described in connection with said figures, may be configured to perform at least one embodiment of the method illustrated in FIG. 4 and/or described in connection thereto for determining the rotor position of the motor 12.

Thus, in various embodiments, the control unit 14A may comprise at least a processing unit, such as a processor or a microcontroller, for, for example, performing calculations and/or executing computer program code, and a memory for storing such code, measurement data, etc.

In some embodiments, the rotor of the motor 12 may be arranged to maintain its position, such as be locked into its position, at least during a portion of the process for determining the rotor position of the motor 12 by a mechanical or electromechanical brake applying a force to oppose the movement of the rotor.

In various embodiments, the electric motor 12 may be one of the following: a synchronous reluctance motor, a permanent magnet motor, a permanent magnet linear motor, a permanent magnet assisted synchronous reluctance motor, a linear switched reluctance motor.

FIG. 2 illustrates schematically an elevator 100 according to an embodiment of the present invention. The elevator 100 may comprise an elevator car 10 coupled to a counterweight 17 via a rope 19, a belt or similar. The rope 19, or similar, may travel around a drive sheave 18 into which an electric motor 12 is configured to generate a force to the drive sheave 18 for causing the elevator car 10 to move in response to an operation of the electric motor 12. Specifically, the elevator car 10 may be arranged to move in response to movement, such as rotation, of the rotor 11 of the motor 12.

At least one elevator brake 16, that is one, two or several, may be arranged so that when controlled by de-energizing, it is configured to meet the drive sheave 18 and, in that manner, to brake a movement of the motor 12, particularly the rotor 11 thereof, and, thus, the elevator car 10 or to keep elevator car 10 standstill in the shaft. When the brake 16 is energized, the brake 16 opens, thus allowing the movement of elevator car 10. The elevator 100 may alternatively be implemented without the counterweight 17. The motor 12 may alternatively be in a form of a linear motor, having a stator which extends along the elevator shaft and a rotor, or "mover", coupled to the elevator car 10, as shown in FIG. 3.

The elevator 100 may comprise an elevator control unit 1000 for controlling the operation of the elevator 100. The elevator control unit 1000 may be a separate device or may be comprised in the other components of the elevator 100 such as in or as a part of the electrical drive 14. The elevator control unit 1000 may also be implemented in a distributed manner so that, for example, one portion of the elevator control unit 1000 may be comprised in the electrical drive 14, such as control unit 14A thereof, and another portion in the elevator car 10. The elevator control unit 1000 may also be arranged in distributed manner at more than two locations or in more than two devices.

The elevator control unit 1000 and/or the control unit 14A may comprise one or more processors, one or more memories being volatile or non-volatile for storing portions of computer program code and any data values and possibly one or more user interface units. The mentioned elements may be communicatively coupled to each other with e.g. an internal bus.

The processor of the elevator control unit 1000 and/or the control unit 14A may at least be configured to implement at least some method steps as described hereinlater, such as in FIG. 4 and what is described in connection with FIG. 4. The implementation of the method may be achieved by arranging the processor to execute at least some portion of computer program code stored in the memory causing the processor, and thus the elevator control unit 1000 and/or the control unit 14A, to implement one or more method steps as described hereinlater. The processor may thus be arranged to access the memory and retrieve and store any information therefrom and thereto. For sake of clarity, the processor herein refers to any unit suitable for processing information and control the operation of the elevator control unit 1000 and/or the control unit 14A, among other tasks. The operations may also be implemented with a microcontroller solution with embedded software. Similarly, the memory is not limited to a certain type of memory only, but any memory type suitable for storing the described pieces of information may be applied in the context of the present invention.

FIG. 3 illustrates schematically an elevator 100 according to an embodiment of the present invention. The elevator 100 may comprise at least one or a plurality of elevator cars 10 moving in the elevator shaft 13 or the elevator car pathway 13. The elevator car(s) 10 may comprise an electrical converter unit 14, such as comprising a converter device 14D, for example, a frequency converter or an inverter, and/or a second energy storage such as a battery or batteries. The electrical converter unit 14 may be utilized for operating a mover 11 arranged to the elevator car 10 for moving the car 10 along the elevator shaft 13. There may also be other electrically operated equipment in the elevator car 10 such as lighting, doors, user interface, emergency rescue equipment, etc. The electrical converter unit 14 or a further converter, such as an inverter or a rectifier, may be utilized for operating one or several of said other equipment of the elevator car 10. The second energy storage may, preferably, be electrically coupled to the electrical converter unit 14, for example, to the intermediate circuit 23 thereof, for providing electrical power to the electrical converter unit 14 and/or for storing electrical energy provided by the electrical converter unit 14 or a further converter or other electrical power source. The elevator 100 may, preferably, comprise an elevator control unit 1000 and/or the control unit 14A such as, or a similar one as, described in connection with FIG. 2.

There may be one or several movers 11 coupled to one or each of the elevator cars 10. Depending on the structure of the electric linear motor 12, such as the number of stator beams 12A, the number of movers 11 may vary.

There may, preferably, be at least two landing floors, having landing floor doors 25 or openings 25, comprised in the elevator 100. There may also be doors comprised in the elevator car 10. Although shown in FIG. 3 that there are two horizontally separated sets, or "columns", of vertically aligned landing floors, there could as well be only one column as in conventional elevators or more than two, for example, three.

Regarding the elevator shaft 13, it may be such as defining substantially closed volume in which the elevator car 10 is adapted and configured to be moved. The walls may be, for example, of concrete, metal or at least partly of glass, or any combination thereof. The elevator shaft 13 herein refers basically to any structure or pathway along which the elevator car 10 is configured to be moved.

As can be seen in FIG. 3 with respect to the multi-car elevator 100, the elevator car 10 or cars 10 may be moved along the elevator shaft 13 vertically and/or horizontally depending on the direction of stator beams 12A. According to embodiments similar to one in FIG. 3 in this respect, the elevator car 10 or cars 10 may be configured to be moved along a number of vertical and/or horizontal stator beams, for example, two beams such as in FIG. 3. The stator beams 12A are part of an electric linear motor of the elevator 100 utilized to move the elevator car 10 or cars 10 in the elevator shaft 13. The stator beams 12A may, preferably, be arranged in fixed manner, that is, stationary with respect to the elevator shaft 13, for example, to a wall of the shaft by fastening portions, which may be arranged to rotatable at direction changing positions of the elevator car 10.

Figure 4:
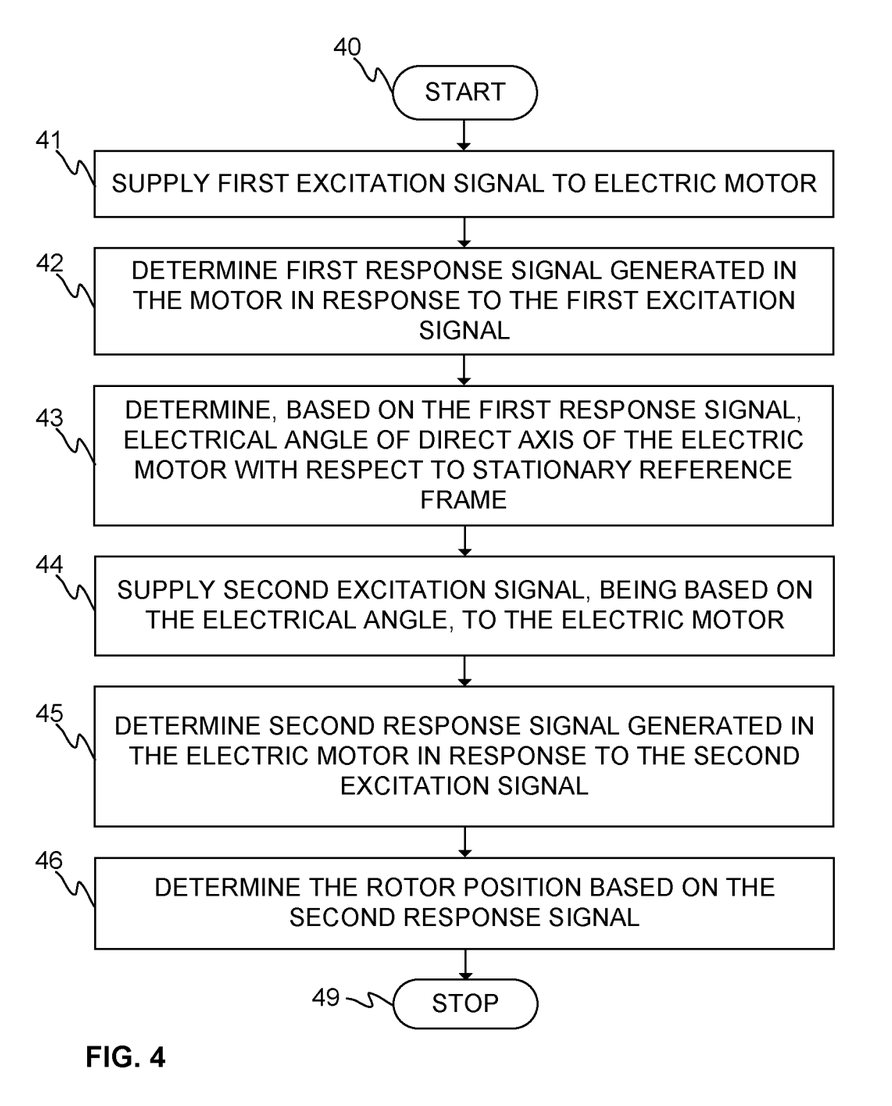
FIG. 4 illustrates a flow diagram of a method according to an embodiment of the present invention.

FIG. 4 illustrates a flow diagram of a method according to an embodiment of the present invention.

In general, the method includes at least two main parts. Furthermore, preferably, the rotor 11 of the motor 12 may be arranged to maintain its position, for example, by applying a force opposing the movement of the rotor 11 from its position at least during the first main part and, optionally, also during the second main part.

In the first main part, at least a first excitation signal, such as current or voltage, is being supplied to the electric motor 12 and a first response signal, such as voltage or current, respectively, generated in the motor in response to the first excitation signal. Based on the first response signal, the positions of the direct and quadrature axes may be determined. An example of this is illustrated highly schematically in FIG. 5A which illustrates the first response current RS1 as a function of electrical angle, for instance, one or two full cycles from zero to 360, or from zero to 720 degrees. The horizontal axis in FIG. 5A does not necessarily correspond to zero amplitude but rather to some finite positive value. In some embodiments, the horizontal axis may refer to zero amplitude.

However, in some embodiments, as the amplitude of the first excitation signal, for example, the vector quantity thereof, may be arranged to be low so that the force produced by the first excitation signal for moving the rotor 11 is less than the force opposing the movement of the rotor 11, it may be that the positions of the north and south poles in the rotor 11 cannot be determined in the first main part due to the low amplitude of the excitation signal. On the other hand, only small amount of force is needed to maintain the rotor 11 in its position. This may be provided with, for example, only one brake, such as one elevator brake 16.

In the second main part, at least a second excitation signal is being supplied to the motor 12. The second excitation signal is, preferably, formed based on the determined position of the direct axis D of the electric motor 12. Therefore, as the characteristics of the second excitation signal correspond to the position of the direct axis D, in ideal case, no force for moving the rotor 11 is generated due to the second excitation signal even though the amplitude of the second excitation signal would be significantly higher than that of the first excitation signal. In practice, due to the structure of the motor 12, for instance, some low amount of force for moving the rotor 11 may be generated by the second excitation signal. Subsequently, the second response current generated in response to the second excitation signal may be determined. As the amplitude of the second excitation signal is significant, or at least higher than that of the first excitation signal, now the position of the north, related to +D in FIG. 5B, and south, related to −D in FIG. 5B, poles in the rotor 11 may now in the second main part be arranged to be determined.

Figure 5A:
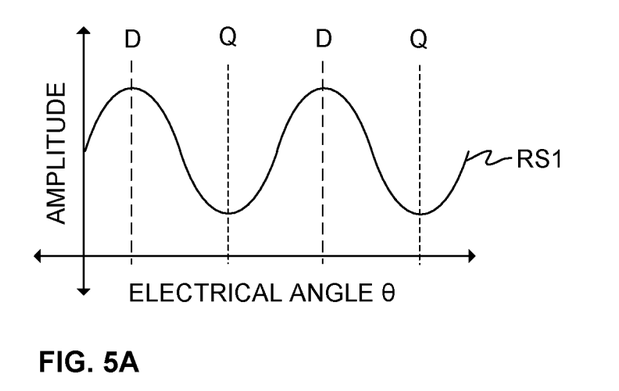
FIGS. 5A and 5B illustrate schematically examples of the first and the second response signals in accordance with an embodiment of the present invention.
Figure 5B:
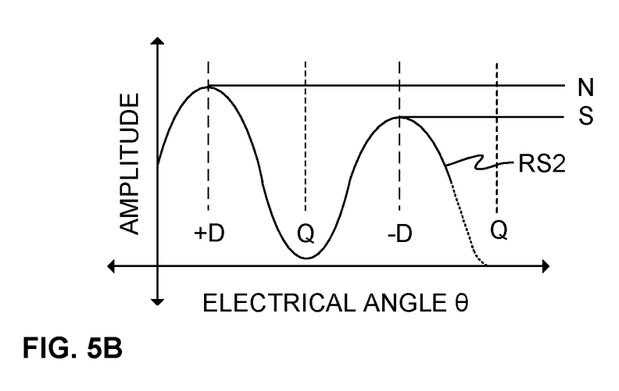

An example of this is illustrated highly schematically in FIG. 5B which illustrates the second response current RS2 as a function of electrical angle. As can be seen, the higher amplitude may refer to a north pole and the lower amplitude to a south pole. It should be noted that the electrical angles in FIGS. 5A and 5B, preferably, correspond in the sense that the same direct axis in FIG. 5A is located at the corresponding electrical angle in FIG. 5B. The horizontal axis in FIG. 5B does not necessarily correspond to zero amplitude but rather to some finite positive value. In some embodiments, the horizontal axis may refer to zero amplitude.

As can be seen in FIG. 5B, the said determining 46 of the rotor position may comprise comparing values of maxima of the second response current RS2 for determining positions of south and north poles of the rotor 11. As evident from FIG. 5B, the value of the maximum at a north pole N may be higher than the value of the maximum at a south pole S. At the north pole N the magnetic core of the motor 12 is being magnetized and, thus, the amplitude of the current increases. At the south pole S the magnetic core of the motor 12 is being demagnetized and, thus, the amplitude of the current decreases.

Thus, as a result of the first and second main parts, the position of the rotor 11 can be determined without the need to have high amount of force for maintaining the rotor 11 in its position. Also, noise and vibrations due to the excitation signals can be made lower than in known solutions.

Item 40 may refer to a start-up phase during which the necessary tasks such as components and systems are obtained, and calibration and other configuration may take place.

Item 41 may refer to supplying a first excitation signal, such as a first alternating voltage or current signal, to the electric motor 12.

The first excitation signal may, preferably, be configured to rotate over at least one pole pair of the motor 12.

According to various embodiments, the amplitude of the first excitation signal, such as the first alternating voltage signal, may be such that it generates a current or currents in the motor 12 which magnetically saturates at least part of the core material of the rotor 11.

In addition, the first excitation signal may comprise consecutively supplying one alternating voltage signal generating a rotating field in one direction and another alternating voltage signal generating a rotating field in an opposite direction inside the motor 12.

In addition, the method may comprise, prior to said supplying 41 the first excitation signal, applying a force having a first amount for maintaining a rotor 11 of the motor 12 in its position at least during said supplying of the first excitation signal and said determining the first response signal RS1, wherein the first amount is with respect to a direction for opposing the movement of the rotor 11 which, therefore, maintains the rotor 11 in its position even if the first excitation signal produces some force which would otherwise cause the rotor 11 to move. Thus, a force for moving the rotor 11 produced by the first excitation signal may be less than the first amount so that the rotor 11 maintains its position at least during the supplying 41 of the first excitation signal. The first amount may, for example, correspond to the braking force of one brake 16, such as of one of the at least one elevator brake 16.

Item 42 may refer to determining a first response signal RS1, such as current or voltage, generated in the electric motor 12 in response to the first excitation signal. Preferably, the determining of the electrical angle may comprise determining electrical angle of the first excitation signal at which a maximum of the first response signal RS1, such as current, occurs.

In some embodiments, the amplitude of the first excitation signal is such that it causes lower force for moving the rotor 11 than the first amount, such as of the braking force for opposing the movement of the rotor 11.

Item 43 may refer to determining, based on the first response signal RS1, an electrical angle of a direct axis D of the electric motor 12 with respect to a stationary reference frame, such as related to a stator of the electric motor 12.

Item 44 may refer to supplying a second excitation signal to the electric motor 12, wherein the second excitation signal is based on the determined electrical angle.

In various embodiments, the amplitude of the second excitation signal may be at least two, preferably at least three, or even more preferably at least four times the amplitude of the first excitation signal.

In various embodiments, the second excitation signal may be configured to be supplied by gradually increasing its amplitude for avoiding a step-like change in the generated force in the motor 13. The gradual increase in the excitation signal minimizes noise due to motor bearing clearance, that is, because the second excitation signal would cause the rotor 11 to move due to the clearance.

Item 45 may refer to determining a second response signal RS2, such as current or voltage, generated in the electric motor 12 in response to the second excitation signal.

Item 46 may refer to determining the rotor position based on the second response signal RS2, such as current or voltage. In various embodiments, the determining of the rotor position may comprise comparing values of maxima of the second response signal RS2 for determining positions of south S and north N poles of the rotor 11.

At item 49, the method execution is ended or stopped. The method may be performed once, continuously, intermittently, on demand or periodically.

In various embodiments, the electric motor 12 may be an elevator motor 12 of an elevator 100, wherein the elevator 100 comprises at least one elevator brake 16 for braking the motor 12, and the method comprises applying the force by the at least one elevator brake 16, for example, by the first amount.

Figure 6A:
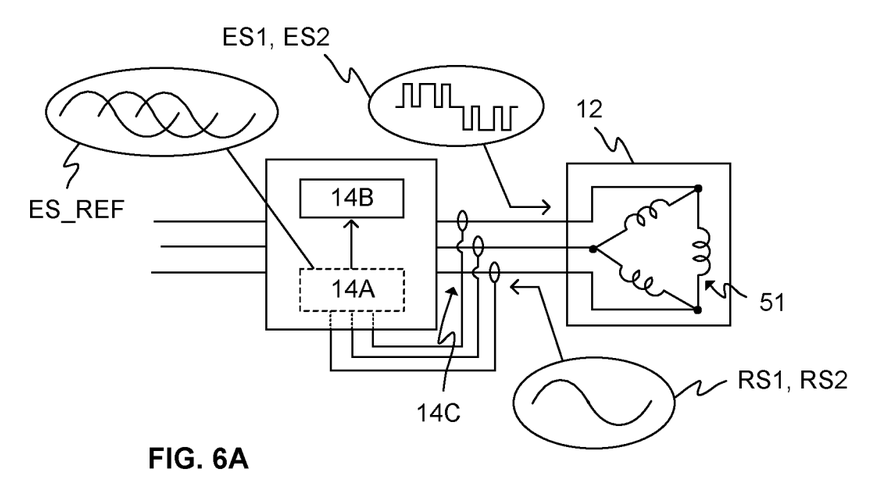
FIGS. 6A and 6B illustrate schematically electrical converter units according to some embodiments of the present invention.
Figure 6B:
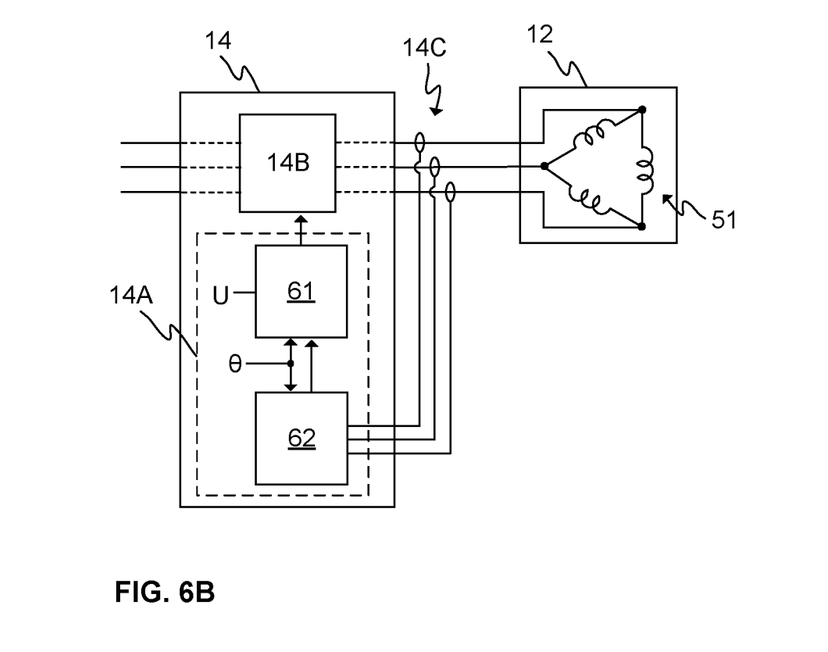

It should be kept in mind, for example with respect to FIGS. 6A and 6B, that the movement of the rotor 11, or the mover 11, of the electric motor 12 may be prevented during the determination of the position of the rotor 11 as described hereinbefore, such as by a brake 16, such as, at least one elevator brake 16.

FIG. 6A illustrates schematically an electrical converter unit 14 according to an embodiment of the present invention. The electrical converter unit 14 may be electrically connected with an electric motor 12, such a synchronous reluctance motor, a permanent magnet motor, a permanent magnet linear motor, a permanent magnet assisted synchronous reluctance motor, or a linear switched reluctance motor. Motor windings 51, such as comprised in the rotor 11, the stator, or the mover 11 in case of linear motor, have been schematically shown as inductors. Although the inductors are shown as having delta configuration, the windings may alternatively be in wye or star configuration, for instance. The converter unit 14 may comprise a converter device 14D, for example, a frequency converter or an inverter, such as including solid-state semiconductor switches. The switches may be, for example, insulated-gate bipolar transistors or silicon carbide junction field-effect transistors. Examples of the converter unit 14 are described hereinbefore with respect to FIGS. 1A-1C.

FIG. 6A illustrates an example of the first excitation signal ES1 across or of one winding, that is, for example, between two phases of the motor 12. It should, however, be noted that in case of voltage, it may be between a phase and the ground potential. The first excitation signal ES1 is, in this example, an alternating voltage signal, however, it could, in some other embodiments, be an alternating current signal.

The electrical converter unit 14 may, preferably, be configured to generate the first excitation signal ES1. As illustrated in the example shown in FIG. 6A, the first excitation signal ES1 is an alternating voltage signal generated by PWM in the converter unit 14. Similar signals, however, having phase difference with respect to the one discussed may also be generated across the other two inductors. The converter unit 14 may be controlled by the control unit 14A in which the reference excitation signal(s) ES_REF may be formed. In FIG. 6A, the reference excitation signal(s) ES_REF are formed for producing the first excitation signal ES1, however, the second excitation signal ES2 may be produced in similar manner. The reference excitation signal(s) ES_REF may include reference signals of all three phases, such as shown in FIG. 6A, or it may be a vector, such as a voltage vector, utilizable in a vector control method executed in the electrical converter unit 14, and specifically with respect to control of the controllable switches thereof.

Therefore, in various embodiments, the amplitude of a reference voltage or current vector may be configured to be constant, however, the vector is configured to rotate.

Furthermore, by supplying the first excitation signal ES1 to the motor 12, a first response signal RS1 is generated in the motor 12 which may be determined by the current 14C or voltage determining means. In some other embodiments, the first response current RS1 may be a voltage signal. The first response current RS1 in FIG. 6A is the current of one phase of the motor 12. Because the motor 12 is typically an inductive load, the first excitation signal ES1 and the corresponding first response current RS1 have a phase shift.

FIG. 6B illustrates schematically an electrical converter unit 14 according to an embodiment of the present invention. The unit 14 may comprise a conversion unit, preferably in the control unit 14A, for forming a three-phase supply voltage reference ES_REF, such as including voltages of R-, S-, and T-phases, for instance, based on the amplitude reference U and on the electrical angle reference θ, in which case the three-phase supply voltage reference is formed as a function of the electrical angle reference θ. The supply voltage reference of, for example, the R-phase may in this case be of the form: amplitude*sin(θ), wherein the amplitude may equal to U.

In an embodiment, the control block 61 of the load bridge 22 (see FIG. 1C) of the electrical converter unit 14, for instance, controls the solid-state switches of the load bridge 22 according to the aforementioned three-phase supply voltage reference ES_REF for forming the first excitation signal ES1 for supplying into the electric motor 12. In this embodiment, the value of the electrical angle reference θ may be arranged to change linearly, in which case the rotation, or moving (in linear motors), speed of said supply voltage reference ES_REF and the first excitation signal ES1 is arranged to be constant.

The first response signal RS1, that is, in some embodiments, three phase currents, produced in the winding(s) of the electric motor 12 in response to the first excitation signal ES1 may be arranged to be determined, such as measured, as a function of the electrical angle reference θ of the electric motor 12.

The instantaneous values, such as related to amplitude, of the determined three phase currents, that is the first response signal RS1, may be determined at determining unit 62 with a method known in the prior art.

Furthermore, based on the phase currents or voltage, a current or voltage vector may be determined representing the three phase currents or voltages of the first response current RS1 as is known in the art.

The variation of the inductance in the magnetic circuit of the electric motor 12 according to some embodiments may cause the amplitude of the determined first response current RS1, such as the amplitude of the current vector, to vary as a function of the electrical angle reference θ. This may be seen in the amplitude of the current vector of the first response current RS1 determined based on the three phase currents, an example of which is illustrated highly schematically in FIG. 5A. In an ideal case, in which the impedances are constant, sinusoidal excitation voltages would cause sinusoidal response currents, the amplitude of the current vector of which would have a constant amplitude. However, in practice, this is never the case.

In FIG. 5A, the variation in the amplitude as a function of the electrical angle reference θ results from the inductance of the magnetic circuit of the electric machine varying owing to, among other things, local saturation of the magnetic circuit of the motor 12. Here, local saturation refers to the type of saturation phenomenon of a magnetic circuit, which varies in relation to the electrical angle of the electric motor 12. This kind of local saturation is caused by, among other things, the permanent magnets of the rotor, in which case the position of the permanent magnets in the rotor 11, and thus the position of the direct D and quadrature Q axes of the motor 12, can be determined due to the local saturation. On the other hand, a variation of the geometry of the magnetic circuit, such as a variation in the length of the air gap of the electric motor 12, can also cause a local variation of the inductance of the magnetic circuit of the electric motor 12. This type of variation in the length of the air gap occurs, for example, in salient pole electric motors 12. The local variation of the inductance of the magnetic circuit of the electric motor 12 caused by a variation of the geometry of the magnetic circuit of an electric motor 12 of the afore-mentioned type can also be used for the determination of the position of the rotor 11. In this case as well, the angle of impulsion of the rotor 11, that is the position of the magnetic poles N, S of the rotor 11, can be determined in a situation where the rotor 11 is locked into its position.

Thus, in various embodiments, the amplitude of the first excitation signal ES1 is arranged to be at least such that it causes local saturation of the magnetic circuit of the motor 12 so that variations in the amplitude of the response signal as a function of the electrical angle reference θ occur.

The first excitation signal ES1 may be formed by changing the electrical angle reference θ from zero to 2π, that is, one full cycle. The phase voltages may, thus, be UR=U*sin (θ), US=U*sin (θ+2*π/3) and UT=U*sin (θ−2*π/3). Thus, the voltage vector reference has constant magnitude, however, it causes rotating magnetic field in the motor 12. In case of ideal conditions, the currents would be such as to sum up to zero. However, due to magnetic saturation, the sum of the currents exhibits sine-like variations in its amplitude. The amplitude reveals at which electrical angles are the poles.

The impedance of the magnetic circuit may also cause a phase difference between the supplied first excitation signal ES1 and the determined first response signal RS1, such as current. To compensate for the phase difference, in some embodiments, the measurement described above may be repeated, as described hereinbefore, by supplying consecutively one alternating voltage signal as a function of the electrical angle reference θ and another alternating voltage signal as a function of the electrical angle reference θ. Thus, the first excitation signal ES1 may, in fact, include two or several consecutively supplied signals. The rotation direction of said another alternating voltage signal may be selected to be the opposite to the rotation direction of the one alternating voltage signal of the first excitation signal ES1, in which case the phase difference between said one alternating voltage signal and corresponding the first response current RS1 may be in the opposite direction compared to the phase difference between said another alternating voltage signal of the first excitation signal ES1 and the corresponding current response RS1 thereof. In view of the above, as apparent, the first response current RS1 may, in fact, also include two or several consecutively generated signals.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A method for determining a rotor position of an electric motor, the method comprising
    applying a force having a first amount for maintaining a rotor of the motor in its position,
    supplying a first excitation signal to the electric motor,
    determining a first response signal generated in the electric motor in response to the first excitation signal,
    determining, based on the first response signal, an electrical angle of a direct axis of the electric motor with respect to a stationary reference frame,
    supplying a second excitation signal to the electric motor, wherein the second excitation signal is based on the determined electrical angle,
    determining a second response signal generated in the electric motor in response to the second excitation signal, and
    determining the rotor position based on the second response signal, wherein the force is applied at least during said supplying of the first excitation signal and said determining of the first response signal, and
    the first amount is with respect to a direction for opposing the movement of the rotor.

2. The method according to claim 1, wherein
    the first excitation signal is a first alternating voltage signal, having a constant amplitude, and the first response signal is a first response current generated in response to the first alternating voltage signal, or/and
    the second excitation signal is a second alternating voltage signal, having a constant amplitude, and the second response signal is a second response current generated in response to the second alternating voltage signal.

3. The method according to claim 2, wherein the first excitation signal comprises consecutively supplying one alternating excitation signal generating a rotating field in one direction and another alternating excitation signal generating a rotating field in an opposite direction inside the motor.

4. The method according to claim 1, wherein
    the first excitation signal is a first alternating current signal, having a constant amplitude, and the first response signal is a first response voltage generated in response to the first alternating current signal, or/and
    the second excitation signal is a second alternating current signal, having a constant amplitude, and the second response signal is a second response voltage generated in response to the second alternating current signal.

5. The method according to claim 1, wherein the first excitation signal comprises consecutively supplying one alternating excitation signal generating a rotating field in one direction and another alternating excitation signal, such as voltage or current, generating a rotating field in an opposite direction inside the motor.

6. The method according to claim 1, wherein said determining of the electrical angle comprises determining electrical angle of the first excitation signal at which a maximum of the first response signal occurs.

7. The method according to claim 1, wherein said determining of the rotor position comprises comparing values of maxima of the second response signal for determining positions of south and north poles of the rotor.

8. The method according to claim 1, wherein the second excitation signal is configured to be supplied by gradually increasing its amplitude for avoiding a step-like change in a generated force in the motor.

9. The method according to claim 1, wherein the electric motor is an elevator motor of an elevator, wherein the elevator comprises at least one elevator brake for braking the motor, the method comprises applying the force by the at least one elevator brake.

10. The method according to claim 1, wherein a force for moving the rotor produced by the first excitation signal is less than the first amount so that the rotor maintains its position during the supplying of the first excitation signal.

11. The method according to claim 1, wherein the electric motor is one of the following: a synchronous reluctance motor, a permanent magnet motor, a permanent magnet linear motor, a permanent magnet assisted synchronous reluctance motor, a linear switched reluctance motor.

12. An elevator comprising
    an elevator car,
    an elevator motor configured to move the elevator car,
    an electrical converter unit for operating the elevator motor,
    at least one elevator brake, and
    a control unit configured at least to cause the elevator to:
        apply a force having a first amount for maintaining a rotor of the motor in its position,
        supply a first excitation signal to the elevator motor,
        determine a first response signal generated in the elevator motor in response to the first excitation signal;
    wherein the elevator is further configured to
        determine, based on the first response signal, an electrical angle of a direct axis of the electric motor with respect to a stationary reference frame,
        supply a second excitation signal to the electric motor, wherein the second excitation signal is based on the determined electrical angle, determine a second response signal respectively, generated in the electric motor in response to the second excitation signal, and determine the rotor position based on the second response current, wherein the force is applied at least during said supplying of the first excitation signal and said determining of the first response signal, and the first amount is with respect to a direction for opposing the movement of the rotor.

13. The elevator according to claim 12, wherein said determining of the electrical angle comprises determining electrical angle of the first excitation signal at which a maximum of the first response signal occurs.

14. The elevator according to claim 12, wherein said determining of the rotor position comprises comparing values of maxima of the second response signal for determining positions of south and north poles of the rotor.

15. An electrical converter unit configured to apply a force having a first amount for maintaining a rotor of the motor in its position, supply a first excitation signal to the elevator motor, determine a first response signal respectively, generated in the elevator motor in response to the first excitation signal;

wherein the electrical converter unit is further configured to determine, based on the first response signal, an electrical angle of a direct axis of the electric motor with respect to a stationary reference frame, supply a second excitation signal to the electric motor, wherein the second excitation signal is based on the determined electrical angle, determine a second response signal generated in the electric motor in response to the second excitation signal, and determine the rotor position based on the second response signal, wherein the force is applied at least during said supplying of the first excitation signal and said determining of the first response signal, and the first amount is with respect to a direction for opposing the movement of the rotor.

16. The electrical converter unit according to claim 15, comprising a converter device and current and/or voltage determination means for determining at least the first and second response signals.

* * * * *